July 17, 1951    M. C. PATTERSON, JR    2,560,738
PIPE CUTTING MACHINE
Filed Feb. 28, 1948    2 Sheets-Sheet 1
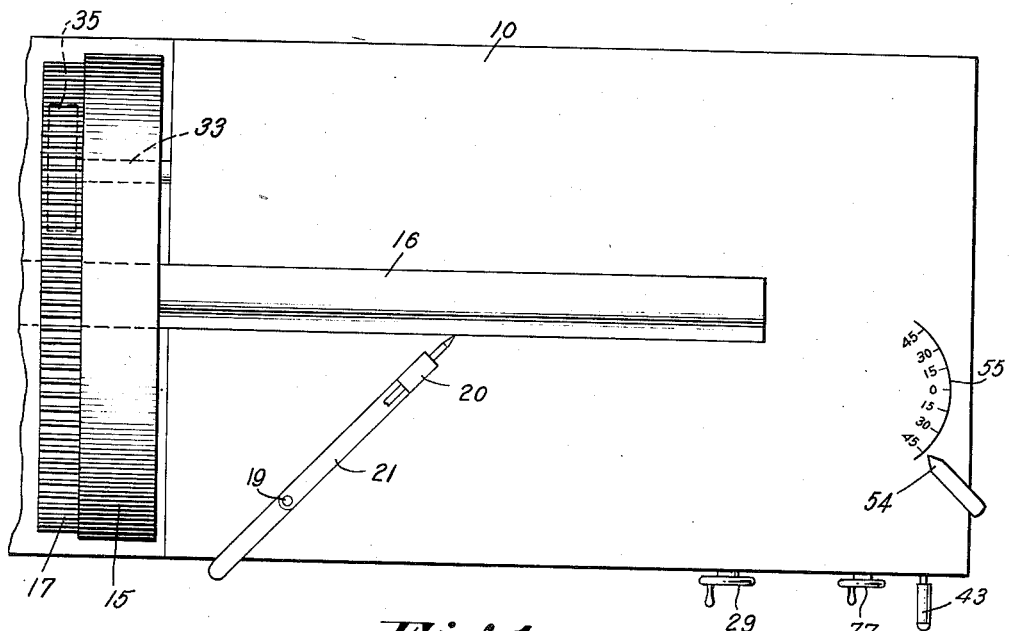
Fig.1.
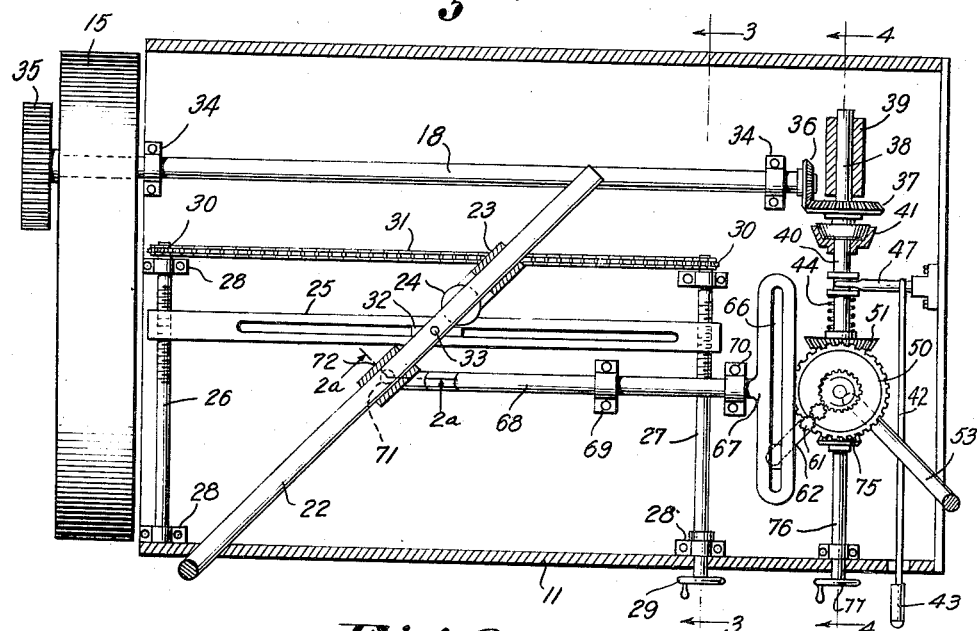
Fig.2.
Fig.2a.
Inventor
Martin C. Patterson, Jr.
By Donald E. Lane
Attorney

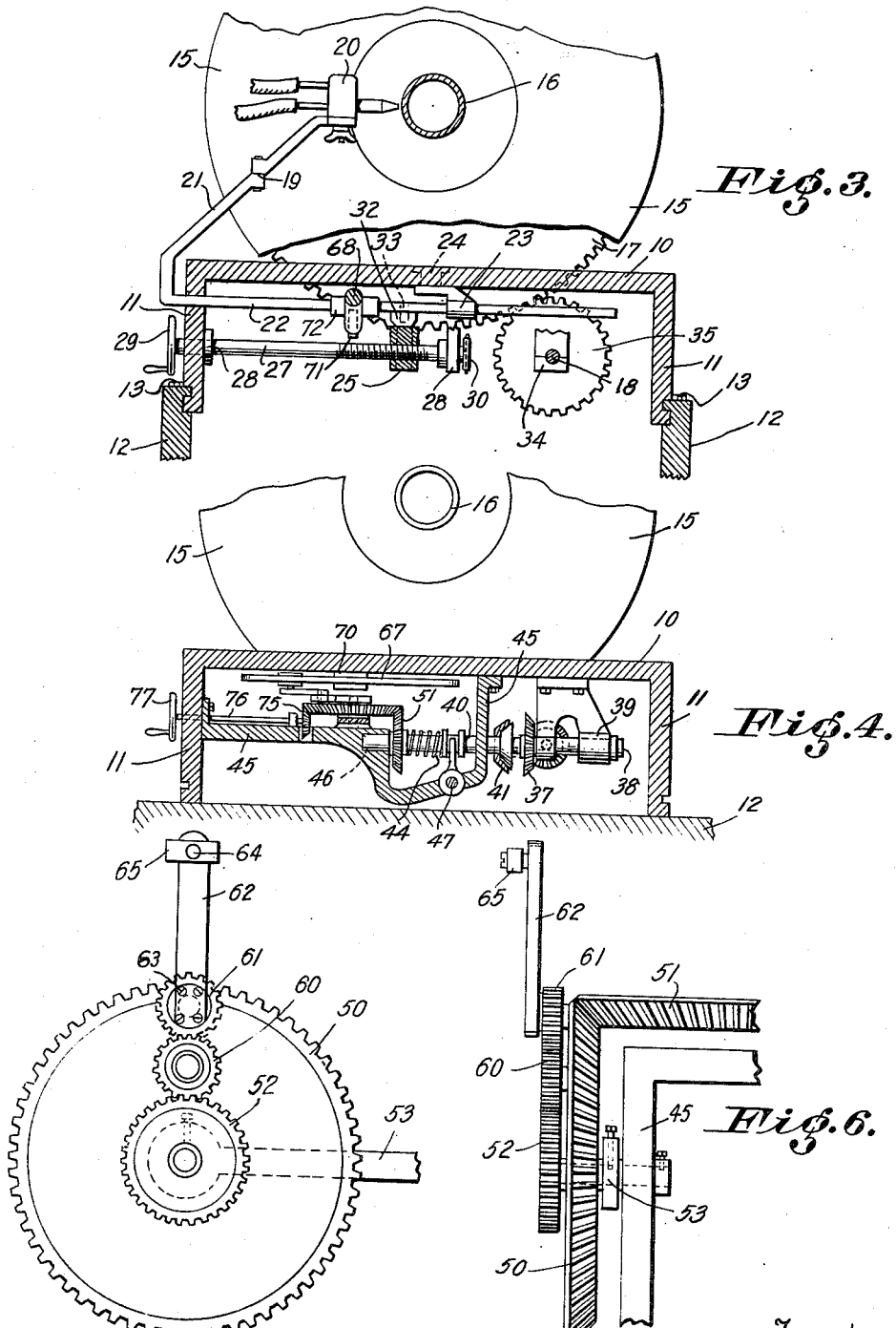

Patented July 17, 1951

2,560,738

UNITED STATES PATENT OFFICE 2,560,738

PIPE-CUTTING MACHINE

Martin C. Patterson, Jr., Joplin, Mo.

Application February 28, 1948, Serial No. 12,022

9 Claims. (Cl. 266—23)

This invention relates to a cutting machine and more particularly to apparatus for attachment to a universal pipe machine for cutting pipes of various diameters with angular cuts.

Machines for cutting pipes by means of an oxyacetylene blow torch are known as shown in the patent issued to Sherman C. Twigg and George D. Major, No. 1,954,549 dated April 10, 1934, and the patent to Tweit, No. 1,963,537 dated June 19, 1934. Such patented machines provide intricate mechanisms for cutting pipes at desired angles. Pipe cutting machines such as those shown in these patents are cumbersome to operates and expensive to construct.

It is an object of this invention to provide a pipe cutting attachment which may be easily applied to a universal pipe machine and which may be driven by said machine.

It is another object of this invention to provide a pipe cutting machine which may be easily adjusted to cut pipes of different diameters at a desired angle of cut.

It is another object of this invention to provide an angular pipe cutting attachment which assures that the cut will be in a single plane at a desired angle to the longitudinal axis of the pipe being cut.

It is a further object of the invention to provide an angular pipe cutting attachment which may be easily adjusted by convenient hand wheels and levers for the diameter of pipe to be cut and for the angle of the cut.

It is a still further object of this invention to provide an angular pipe cutting machine in which the cutter is maintained at the proper distance from the pipe being cut.

Other objects and advantages of this invention will be readily apparent to those skilled in the art from examination of the following description of the preferred embodiment illustrated in the accompanying drawings, wherein:

Figure 1 is a plan view showing an angular pipe cutting attachment for a conventional pipe threading machine, only the universal head of the latter being shown.

Figure 2 is a plan view partly in section of the mechanisms supported on the under side of the attachment shown in Figure 1.

Figure 2a is a fragmentary vertical sectional view taken on line 2a—2a of Figure 2.

Figure 3 is a sectional view taken on line 3—3 of Figure 2.

Figure 4 is a sectional view taken on line 4—4 of Figure 2.

Figure 5 is an enlarged plan view of a portion of the gearing shown in Figure 2.

Figure 6 is an elevation view partly cut away of the gearing shown in Figure 5.

Referring to the drawings for the purpose of illustration, the angular pipe cutting attachment of this invention includes a platform designated by the numeral 10 provided with suitable supporting legs or flanges 11. The supporting flanges 11 are adapted to rest on or slide into supports 12, which latter may be a portion of a universal pipe machine as shown in Figure 3, or may be a separate stand as shown in Figure 4. The flanges 11 may be secured to the support 12 by means of clamping lugs 13.

The head of a universal pipe machine is designated by the numeral 15 and is adapted to be rotated by power driven means not shown, and is provided with adjustable jaws, not shown, to grip the surface of a length of pipe 16 to be cut. The head 15 may be driven by a gear 17 connected thereto, and is adapted to grip pipes of different diameters, as is well known in the art.

The pipe cutting tool is illustrated as a cutting blow torch 20 carried by a supporting arm 21 extending above the platform 10 and then through a slot in the flange 11 to a horizontal rod 22. A pivotable joint 19 may be provided in the upper portion of arm 21 to permit the torch 20 to be temporarily swung away from the pipe 16 for lighting and adjustment of the cutting flame. The torch 20 may be provided with suitable supply connections and controls, as are well known, or the torch 20 may be replaced by other known types of cutting implements. The arm 21 is such as to support the torch 20 so that the axis of the cutting flame intersects the longitudinal axis of the pipe 16. The rod 22 is supported for both horizontal sliding and swinging movements by the sleeve 23, which latter is carried by a vertical-axis pivot 24 journaled in the platform 10. A slotted bar 25 having a threaded aperture in each end is supported below the platform 10 on threaded rods 26 and 27, the latter being journaled in bearings 28. Rod 27 is provided with an operating handle 29 and is connected to the rod 26 by sprockets 30 and an endless chain 31, so that turning the rod 27 also turns rod 26 a like amount. When the handle 29 is turned, the bar 25 is adjusted forward or backward horizontally, always parallel to the axis of the pipe to be cut. A sliding block 32 has a portion which is slidable in the slotted portion of bar 25 and carries a vertical pin 33 which engages a vertical opening in the rod 22. The pin 33 is vertically below the cutting portion of the flame of torch 20, as shown in Figure 3, and since the pin 33 is confined to straight line movement in a direction parallel to an element of the surface of pipe 16 by its supporting block 32 in the bar 25, the pin 33 serves to slide the torch rod 22 in its support 23 so that the cutting flame is always properly positioned with respect to the surface of the pipe to be cut. Adjustment of the wheel 29 may be made to move the bar 25 forward or backward, and thus adjust the position of the torch flame to permit pipes of various diameters to be cut.

Mechanism for swinging the torch rod 22 about the pivot 24 will now be described. A drive shaft 18 is journaled under the platform 10 in bearings 34 and is provided with a gear 35 which engages the gear 17 of the head 15. A bevel gear 36 on the right end of shaft 18 engages a bevel gear 37 secured on a shaft 38 journaled in bearing 39. Shaft 38 is aligned with shaft 40, and a manually operated spring clutch 41 is provided for connecting shaft 38 to rotate shaft 40. The clutch 41 may be operated by a suitably pivoted lever 42 having a handle 43 at the front of the attachment. A spring 44 may be provided on the shaft 40 to keep the clutch 41 normally engaged. A supporting bracket 45 extends from the front flange 11 to the platform 10 to provide a supporting bearing 46 for the shaft 40 and to provide a clutch operating shaft 47 for the clutch lever 42. A bevel gear 50 is mounted on a vertical pivot carried by the bracket 45 and engages the bevel gear 51 secured on the shaft 40. The spur gear 52 is journaled on the same axis as bevel gear 50, and is provided with a manual adjusting lever 53 rigidly secured thereto for turning the gear 52 through an angle of about ninety degrees. The lever 53 may extend upwardly over the right edge of the platform 10 and be provided with a pointer 54 which indicates on the scale 55 the angle to which the gear 52 is adjusted. A suitable spring-pressed ball, not shown, may be carried by the pointer 54 to hold the pointer and lever 53 in adjusted position. An idler gear 60 is pivotally supported on the upper side of gear 50 in engagement with the gear 52. Another gear 61 is pivotally supported on the upper side of gear 50 near the periphery thereof and in radial alignment with the axis of idler gear 60 and in engagement with gear 60. An operating arm 62 is rigidly secured to gear 61, as by screws 63, and is provided at its outer end with a vertical pin or spindle 64 carrying a roller or sliding block 65. The sliding block 65 engages a slot 66 in the reciprocatory member 67. It will be readily apparent that sprockets may be substituted for gears 52 and 61, the sprockets being connected to each other by an endless chain or belt. Such a construction would eliminate the idler gear 60 since its function would be accomplished by the chain or belt. The member 67 is provided with a shank 68 of rectangular or oblong cross-section which is supported for reciprocatory movement in bearings 69 and 70. The left end of shank 68 is provided with a vertical pin 71 engaging a sleeve 72 which latter surrounds a portion of the rod 22. The rod 22 is slidable back and forth in the sleeve 72 as the shank 68 reciprocates in its bearings 69 and 70, and shank 68 may be pivotally connected to the sleeve 72 by pin 71 as shown in Figure 2a.

The gear train including gears 51, 50, 52, 60 and 61 and the arm 62 provide for changing rotary motion of the shaft 40 into simple harmonic reciprocatory movement of the member 67. For the arrangement illustrated, the gears 60 and 61 have an equal number of teeth and the gear 52 has twice as many teeth as gear 60. During operation, gear 52 remains stationary. The distance from the center of pin 64 to the axis of gear 61 is equal to the distance from the axis of gear 52 to the axis of gear 61. When gear 50 is turned by gear 51, it moves idler gear 60 around the stationary gear 52. Gear 60 is thus caused to rotate on its axis and in turn to rotate the gear 61 in an opposite direction. The gear ratios and distances are such that the pivot 64 always is moved in a straight radial line passing through the axis of gears 50 and 52, and the member 67 is reciprocated with simple harmonic motion when the driving gear 51 is rotated at constant speed. An adjusting gear 75 is provided on the shaft 76 having a handle wheel 77 at the front of the attachment. Gear 75 may be meshed with gear 50 to manually adjust the latter about its axis when the clutch 41 is disengaged by its operating handle 43. The position of the cutting tool 20 may thus be manually adjusted to a starting position in which the supporting arm 21 is at right angles to the axis of the pipe 16, thereby permitting proper positioning of the pipe 16 for cutting at a desired angle or length.

The operation of the pipe cutting attachment herein disclosed will now be described. The pointer 54 is set to the desired angle of cut to be made, clutch 41 is disengaged by handle 43, and control 77 is turned to align the cutting tool 20 and its supporting arm 21 perpendicular to the axis of the head 15. The pipe 16 to be cut is clamped in the head 15 so that the center of the axial length of cut to be made is opposite the cutting tool 20. The control 29 is adjusted to position the cutting tool 20 at or a proper distance from the surface of the pipe 16, depending on the nature of the cutting tool being used. With clutch 41 engaged, the head 15 is rotated and the cutting torch 20 is ignited if a torch cutting tool is being used. Rotation of the head 15 and the gear 17 causes rotation of the gear 50 through gears 35, 36, 37, clutch 41, and gear 51. By having the ratio between gears 17 and 35 one to four, that is, so gear 35 makes four revolutions fo reach revolution of gear 17, between gears 36 and 37 two to one, and between 51 and 50 two to one, gear 50 will be rotated at the same revolutions per minute as head 15 and pipe 16. Gear 52 being held against rotation, gear 50 moves idler gear 60 around the stationary gear 52, thereby causing gear 60 to rotate in the same direction as the rotation of gear 50. The rotation of idler gear 60 causes gear 61 to rotate in the opposite direction as gear 50. The ratio between gears 52 and 60 is one to two and between gears 60 and 61 is one to one. Gear 61, therefore, is rotated on its own axis at twice the revolutions per minute of gear 50 and in the opposite direction of rotation. At the same time, the axis of gear 61 is carried by gear 50 around the axis of gear 50. This motion causes the pivot 64 adjacent the outer end of arm 62 secured to gear 61 to be given straight line movement passing to and from the axis of gear 50. Sliding block 65 carried by pivot 64 slides in slot 66 of member 67 causing shank 68 to be reciprocated with simple harmonic movement, except as pointer 54 has been set for zero angle of cutting. In this latter instance, pivot 64 travels forward and backward over the axis of shaft 40 imparting no reciprocatory motion to shank 68.

During angular cutting, too 20 and arm 21 will be swung through one complete cycle back to the starting position for each revolution of the pipe 16, the pivotal movement of the arm 21 being about the axis of pivot 24. The sliding block 32 connected to the supporting arm 22 by pin 33 will slide the arm 22 back and forth in bearing 23 during pivotal movement of the arm 22 to maintain the tool 20 always at the correct cutting position with respect to the surface of the pipe 16. Even after the angular cutting operation has begun, the wheel 29 may be turned slightly to assure proper spacing of the torch 20 from the surface of the pipe 16 and thereby assure proper cutting. The alignment of the torch 20 so that its axis always intersects the axis of pivot 24 and the axis of the pipe 16 provides for cutting the pipe 16 with a flat or plane surface cut as distinguished from a perpendicular cut in which the surface produced by cutting is at right angles to the axis of the pipe.

The position of the torch 20 on the arm 21 may be adjusted by loosening the wing nut shown in Figure 3 securing the torch 20 to the upper portion of the arm 21, so that the axis of the cutting flame is at a slight angle to the axis of supporting rod 22, but so the flame axis still intersects the longitudinal axis of the pipe 16. Such as adjustment will permit the angular cutting operation to produce a beveled angular cut.

The gears illustrated in the drawings may be of any known type and it is desirable that gearing which has little or no play or backlash be employed. It is, therefore, obvious that equivalent mechanical drive connections such as worm gearing, helical gearing, friction gear, and/or belt or chain drives may be suitable to produce the novel results described.

The angular pipe cutting attachment herein described may also be operated to produce junction cuts in which a pipe is provided with a notch or V-shaped cut to receive the end of a second pipe. In making junction cuts, the attachment is operated through only a portion of a complete cycle, and is then stopped while the arm 21 is adjusted to a new position, and another incomplete cutting cycle is made to complete the junction cut. The end of the second pipe to be used to fit the junction cut may also be cut on the attachment herein disclosed by making two or more partial cuts.

It will be obvious to those skilled in the art that numerous modifications and variations may be made from the specific embodiment illustrated and be within the scope of the following claims.

What I claim is:

1. In a machine having a torch for cutting a rotating pipe at a desired angle with respect to the axis of the pipe, the combination comprising; a sliding and swinging support for said torch, a swinging mounting for said support in which said support is slidable, a reciprocable member connected to said support for swinging said support, a sliding member pivotally connected to said support for sliding said support in its swinging mounting, and driven means for moving said reciprocable member during rotation of said pipe.

2. In a machine having a tool for cutting a rotating pipe at a desired angle with respect to the axis of the pipe, the combination comprising; a slidable and swinging arm supporting said tool, a swinging mounting for said arm in which said arm is slidable, a reciprocable member, a member slidable on said arm and pivotally connected to said reciprocable member, a sliding member pivotally connected to said arm for sliding said arm in its swinging mounting, and gear driven means for reciprocating said reciprocable member during rotation of said pipe.

3. In a machine having a torch for cutting a rotating pipe at a desired angle with respect to the axis of the pipe, the combination comprising; a slidable and swinging arm supporting said torch adjacent the surface of said pipe, a swinging mounting for said arm in which said arm is slidable, a sliding member pivotally connected to said arm, an adjustable guide for said sliding member parallel to the axis of said pipe, and reciprocating means slidably and pivotally connected to said arm for swinging said arm.

4. A pipe cutting attachment having a cutting tool for a pipe machine having a head for supporting and rotating a length of pipe on a horizontal axis, said attachment comprising in combination; a table member supported under said pipe, an arm connected to and supporting said tool above said table member, a portion of said arm extending under said table member, a pivotally mounted support for said arm under said table member and in which said arm is slidable, sliding means pivotally connected to said arm under said table member, a guide for said means extending parallel to the longitudinal axis of said pipe, and a reciprocable element under said table member pivotally and slidably connected to said arm for swinging said arm and said support.

5. A pipe cutting attachment having a cutting tool for a pipe machine having a head for supporting and rotating a length of pipe on a horizontal axis, said attachment comprising in combination; a table supported under a portion of said pipe, an arm connected to and supporting said tool above said table adjacent to said pipe, a portion of said arm extending over the edge of said table to the under side thereof, a pivotally mounted support for said arm on the under side of said table and in which said arm is slidable, sliding means supported underneath said table for movement in a direction parallel to the longitudinal axis of said pipe, a pivotal connection between said sliding means and said arm, and reciprocable means under said table slidably connected to said arm for swinging said arm.

6. In a machine having a torch for cutting a rotating pipe at a desired angle with respect to the axis of the pipe, the combination comprising; a pivotally and slidably supported member for positioning said cutting torch adjacent the surface of said pipe and a reciprocable element connected to said member for moving said torch in a direction parallel to the axis of said pipe, means for moving said member including a driven gear, a stationary gear supported coaxial with said driven gear, an idler gear carried by said driven gear around and meshed with said stationary gear, a second gear carried by said driven gear and meshed with said idler gear, a projecting arm carried by said second gear, said reciprocable element having a slot transverse to its direction of reciprocatory motion, and a pivotal connection between the end of said arm and said slot, the distance between the axis of said connection and the axis of said second gear being equal to the distance between the latter and the axis of said driven gear.

7. In a machine having a torch for cutting a rotating pipe at a desired angle with respect to the axis of the pipe, the combination comprising; a supporting arm for said torch, a pivotally mounted sleeve for supporting said arm for pivotal and sliding movement, a reciprocable member pivotally connected to said arm for swinging said arm about the axis of said pivotally mounted sleeve, means for reciprocating said member including a driven rotatable member, a stationary member coaxial with said rotatable member, a second rotatable member carried by said driven rotatable member, driving means connecting said stationary member to said second rotatable member, and a projecting arm rigidly secured to said second rotatable member and pivotally connected to said reciprocable member for reciprocating said member.

8. In a machine having a torch for cutting a rotating pipe at a desired angle with respect to the axis of the pipe, the combination comprising; a slidable arm for supporting said torch, a pivotal support for said slidable arm, a sliding member pivotally connected to said arm, a guide for said sliding member parallel to the axis of the pipe to be cut, a single control for adjusting the position of said guide with respect to said pipe, a reciprocable member connected to said arm for swinging said arm on said pivotal support, and drive means for said reciprocable member having a single control for adjusting the extent of reciprocation of said last named member.

9. In a machine having to torch for cutting a rotating pipe at a desired angle with respect to the axis of the pipe, the combination comprising; a slidable and swinging arm normally supporting said torch adjacent the surface of said pipe, said arm including two parts connected together with a pivotal joint, a swinging mounting for said arm, a reciprocable member slidably and pivotally connected to one part of said supporting arm, a sliding member pivotally connected to said one part of said arm, an adjustable guide for said sliding member parallel to an element of the surface of said pipe, driven means connected to said reciprocable member for reciprocating the same, and an adjustable control associated with said means.

MARTIN C. PATTERSON, Jr.

REFERENCES CITED

The following references are of record in the file of this patent:

UNITED STATES PATENTS

| Number | Name | Date |
|---|---|---|
| 1,661,274 | Steere et al. | Mar. 6, 1928 |
| 1,954,549 | Twigg et al. | Apr. 10, 1934 |
| 1,963,537 | Tweit | June 19, 1934 |
| 2,379,630 | Fall | July 3, 1945 |
| 2,384,128 | Nation | Sept. 4, 1945 |
| 2,432,703 | Walden | Dec. 16, 1947 |
| 2,448,089 | Duvall | Aug. 31, 1948 |